(12) United States Patent
Holtman et al.

(10) Patent No.: US 6,668,773 B2
(45) Date of Patent: Dec. 30, 2003

(54) SYSTEM AND METHOD FOR CALIBRATING VARIABLE ACTUATION SYSTEM

(75) Inventors: Richard Herman Holtman, Dunlap, IL (US); Scott Alan Leman, Eureka, IL (US); Sean O. Cornell, Gridley, IL (US); John Stephen Pipis, Jr., Bloomington, IL (US); Ronald D. Shinogle, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/144,066

(22) Filed: May 14, 2002

(65) Prior Publication Data

US 2003/0213448 A1 Nov. 20, 2003

(51) Int. Cl.[7] .................................................. F01L 9/02
(52) U.S. Cl. .................. 123/90.12; 123/320; 123/90.15
(58) Field of Search .......................... 123/90.12, 90.15, 123/90.16, 320, 321, 322

(56) References Cited

U.S. PATENT DOCUMENTS

| 4,869,222 | A | | 9/1989 | Klassen |
|---|---|---|---|---|
| 5,576,963 | A | | 11/1996 | Ribbens et al. |
| 6,021,758 | A | | 2/2000 | Carey et al. |
| 6,237,551 | B1 | | 5/2001 | Macor et al. |
| 6,378,473 | B2 | * | 4/2002 | Yamaki et al. ............ 123/90.11 |
| 6,431,131 | B1 | * | 8/2002 | Hosoya et al. ............ 123/90.15 |
| 6,505,585 | B1 | * | 1/2003 | Machida et al. .......... 123/90.17 |
| 2001/0003971 | A1 | * | 6/2001 | Hori et al. ................ 123/90.11 |
| 2001/0003972 | A1 | * | 6/2001 | Yamaki et al. ............ 123/90.11 |
| 2002/0056422 | A1 | * | 5/2002 | Yamaki et al. ............ 123/90.11 |
| 2002/0062799 | A1 | * | 5/2002 | Murata et al. ............ 123/90.15 |

* cited by examiner

Primary Examiner—Thomas Denion
Assistant Examiner—Jaime Corrigan
(74) Attorney, Agent, or Firm—Finnegan, Henderson, Farabow, Garrett & Dunner (57) ABSTRACT

A method of calibrating a variable valve actuation system is provided. An engine valve is moved from a first position where the engine valve blocks a flow of fluid to a second position where the engine valve passes a flow of fluid. A valve actuator is actuated to prevent the engine valve from returning to the first position. A signal is transmitted to cause the valve actuator and to allow the engine valve to return to the first position. The return of the engine valve to the first position is determined. A time parameter indicative of an elapsed time between the transmission of the signal and movement of the engine valve to the first position is determined.

16 Claims, 5 Drawing Sheets

SYSTEM AND METHOD FOR CALIBRATING VARIABLE ACTUATION SYSTEM

TECHNICAL FIELD

The present disclosure is directed to a system and method for calibrating a variable valve actuation system and more particularly to a system and method for calibrating a variable valve actuation system for an internal combustion engine.

BACKGROUND

Fuel efficiency is a concern in the design and operation of an internal combustion engine, such as, for example, a diesel, gasoline, or natural gas engine. Accordingly, a significant amount of research and development work is being directed towards improving the fuel efficiency of an internal combustion engine. Any increase in fuel efficiency will directly translate to a reduction in the fuel costs associated with operating the engine.

One possible approach to improving fuel efficiency involves precisely controlling the flow of gases into and out of the engine. This may be accomplished by modifying the typical engine valve actuation system to provide flexibility in the actuation timing of the intake and exhaust valves. This may allow the flow of gases to and from the engine to be tailored to meet the particular operating conditions of the engine.

The engine valves in an internal combustion engine are typically driven by a cam arrangement that is operatively connected to the crankshaft of the engine. The rotation of the crankshaft results in a corresponding rotation of a cam shaft that drives one or more cam followers. The movement of the cam followers results in the actuation of the engine valves. The shape of the cam lobe governs the timing and duration of the valve actuation.

An engine may, however, include a variable valve actuation system, such as described in U.S. Pat. No. 6,237,551 to Macor et al., issued on May 29, 2001. In this type of system, a cam arrangement is configured to hold the engine valves open for a certain period of time and an auxiliary valve is included to selectively disengage the cam assembly. This allows the engine valves to be closed independently of the actuation timing of the cam assembly and improves the control over valve actuation timing.

The improved control provided by a variable valve actuation system may allow for gains in fuel efficiency. The variable valve actuation system may be operated to selectively implement a variation on the typical diesel or Otto cycle during the operation of the engine. For example, the intake valves may be controlled to implement a "late intake" type Miller cycle. In a late intake Miller cycle, the intake valves of the engine are opened for the intake stroke and held open for a portion of the compression stroke of the engine piston.

The implementation of a variation on the conventional valve actuation timing requires precise control over the engine valves. To obtain the gains in fuel efficiency afforded by the selective implementation of a valve actuation variation, the actual opening and closing of the engine valves should occur within a few degrees of crankshaft rotation of the expected opening and closing of the engine valves. Any variation in the actual opening and closing of the engine valves may negate the potential fuel efficiency gains.

However, each valve actuation assembly may have or develop slightly different response characteristics due to manufacturing tolerances, environmental concerns, and/or wear characteristics. In other words, one valve actuation assembly may open or close an engine valve faster or slower than another valve actuation assembly. The different response characteristics of the valve actuation assemblies may result in a decrease in the potential fuel efficiency gain for a particular engine. Accordingly, the effectiveness of a variable valve actuation system may be improved by accounting for different response characteristics in different variable valve assemblies.

The system and method of the present invention solves one or more of the problems set forth above.

SUMMARY OF THE INVENTION

One aspect of the present invention is directed to a method of calibrating a variable valve actuation system. An engine valve is moved from a first position where the engine valve blocks a flow of fluid to a second position where the engine valve passes a flow of fluid. A valve actuator is actuated to prevent the engine valve from returning to the first position. A signal is transmitted to cause the valve actuator and to allow the engine valve to return to the first position. The return of the engine valve to the first position is determined. A time parameter indicative of an elapsed time between the transmission of the signal and movement of the engine valve to the first position is determined.

In another aspect, the present invention is directed to an engine valve actuation system. An engine valve is moveable between a first position where the engine valve blocks a flow of fluid and a second position where the engine valve passes a flow of fluid. A spring is engaged with the engine valve and biases the engine valve towards the first position. A valve actuator is selectively operable to prevent the engine valve from returning to the first position. A sensor is configured to provide an indication when the engine valve is at the first position. A controller delivers a control signal to the valve actuator to return the engine valve to the first position and receives the indication from the sensor. The controller determines an elapsed time between the delivery of the signal and movement of the engine valve to the first position.

BRIEF DESCRIPTION OF THE DRAWINGS

FIG. 4b is a graphic illustration of a displacement of a directional control valve resulting from the exemplary signal of FIG. 4a;

FIG. 4c is a graphic illustration of a displacement of an engine valve resulting from the exemplary signal of FIG. 4a.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
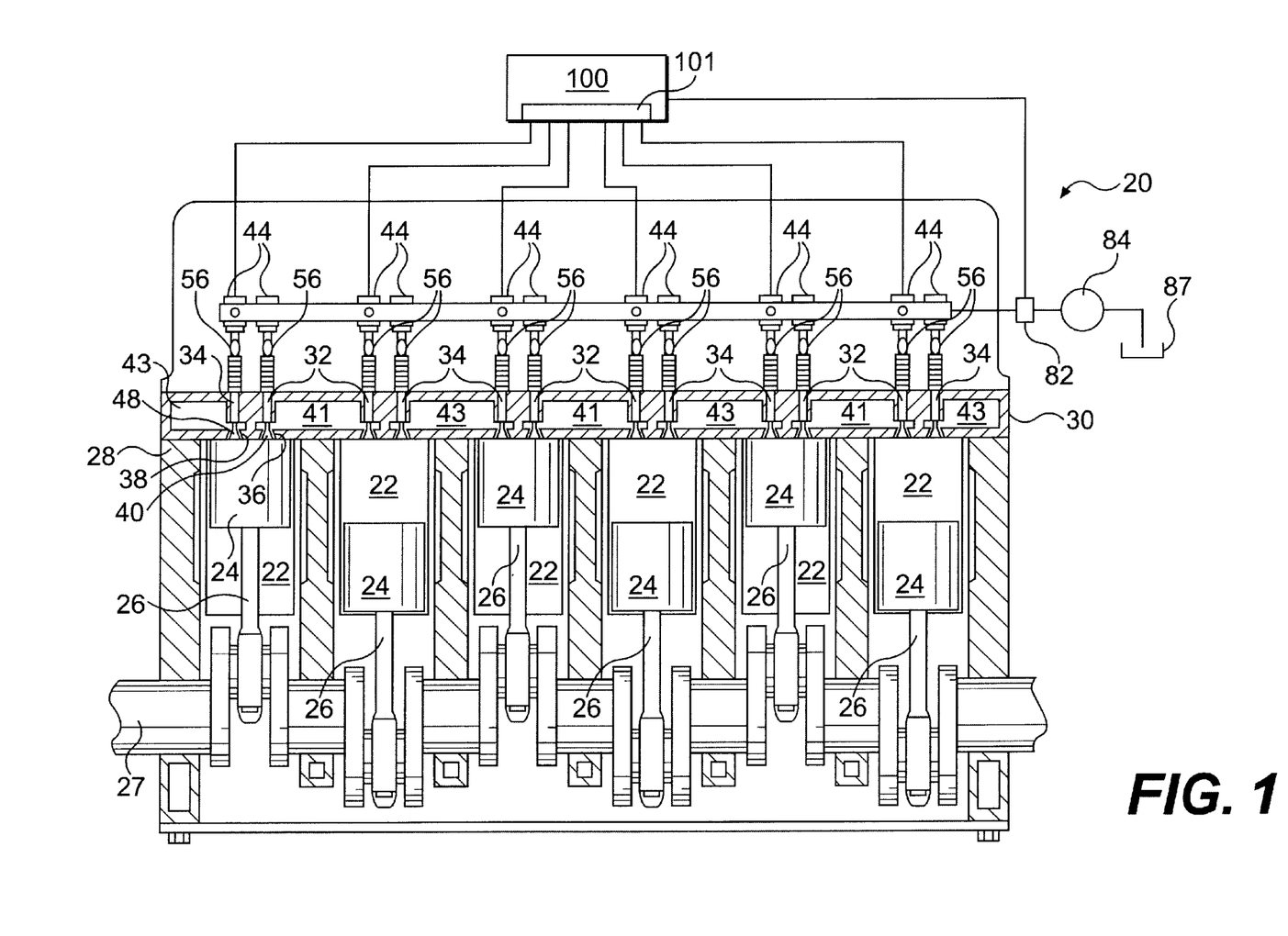
FIG. 1 is a diagrammatic cross-sectional view of an exemplary embodiment of an internal combustion engine.

An exemplary embodiment of an internal combustion engine 20 is illustrated in FIG. 1. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

As illustrated in FIG. 1, engine 20 includes an engine block 28 that defines a plurality of cylinders 22. A piston 24 is slidably disposed within each cylinder 22. In the illustrated embodiment, engine 20 includes six cylinders 22 and six associated pistons 24. One skilled in the art will readily recognize that engine 20 may include a greater or lesser number of pistons 24 and that pistons 24 may be disposed in an "in-line" configuration, a "V" configuration, or any other conventional configuration.

As also shown in FIG. 1, engine 20 includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will result in a sliding motion of piston 24.

Engine 20 also includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 is disposed within each intake port 36. Intake valve 32 includes a valve element 40 that is configured to selectively block intake port 36. As described in greater detail below, each intake valve 32 may be moved between a first, or closed, position and a second, or open position. The intake valves 32 for each cylinder 22 may be moved in unison or independently.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to lift valve element 48 to thereby open the respective exhaust port 38. The exhaust valves 34 for each cylinder 22 may be actuated in unison or independently.

Figure 2:
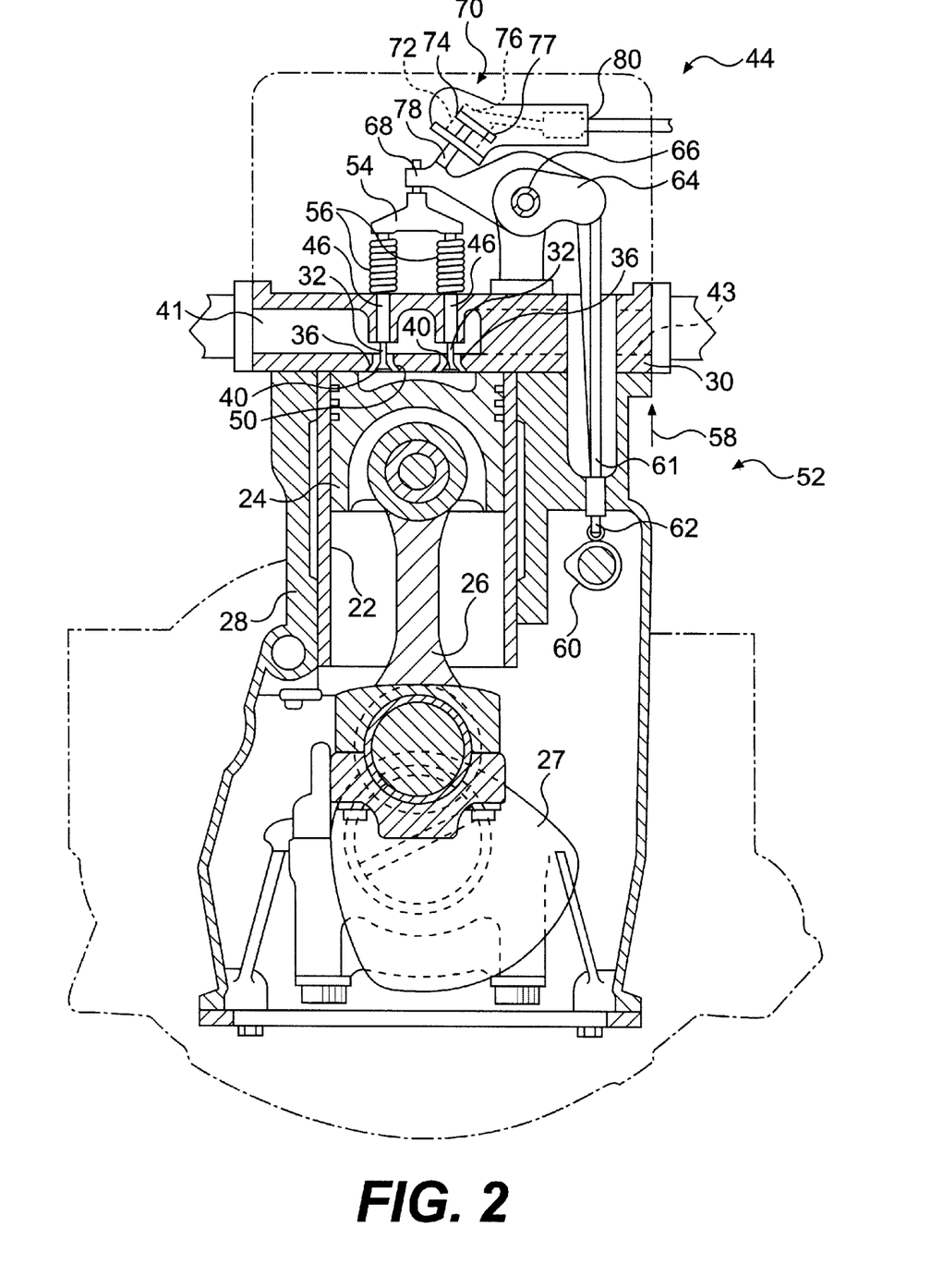
FIG. 2 is a diagrammatic cross-sectional view of a cylinder and valve actuation assembly in accordance with an exemplary embodiment of the present invention.

FIG. 2 illustrates an exemplary embodiment of one cylinder 22 of engine 20. As shown, cylinder head 30 defines a pair of intake ports 36 connecting intake passageway 41 to cylinder 22. Each intake port 36 includes a valve seat 50. One intake valve 32 is disposed within each intake port 36. Valve element 40 of intake valve 32 is configured to engage valve seat 50. When intake valve 32 is in a closed position, valve element 40 engages valve seat 50 to close intake port 36 and blocks fluid flow relative to cylinder 22. When intake valve 32 is lifted from the closed position, intake valve 32 allows a flow of fluid relative to cylinder 22.

Similarly, cylinder head 30 may define two or more exhaust ports 38 (only one of which is illustrated in FIG. 1) that connect cylinder 22 with exhaust passageway 43. One exhaust valve 34 is disposed within each exhaust port 38. A valve element 48 of each exhaust valve 34 is configured to close exhaust port 38 when exhaust valve 34 is in a closed position and block fluid flow relative to cylinder 22. When exhaust valve 34 is lifted from the closed position, exhaust valve 32 allows a flow of fluid relative to cylinder 22.

As shown in FIG. 1, engine 20 includes a series of valve actuation assemblies 44. One valve actuation assembly 44 may be operatively associated with each pair of intake valves 32 for each cylinder 22. Each valve actuation assembly 44 is operable to move or "lift" the associated intake valve 32 or exhaust valve 34 from a closed position to an open position to pass a flow of fluid relative to cylinder 22.

In the exemplary embodiment of FIG. 2, valve actuation assembly 44 includes a bridge 54 that is connected to each valve element 40 through a pair of valve stems 46. A spring 56 may be disposed around each valve stem 46 between cylinder head 30 and bridge 54. Spring 56 acts to bias both valve elements 40 into engagement with the respective valve seat 50 to thereby close each intake port 36.

Valve actuation assembly 44 also includes a rocker arm 64. Rocker arm 64 is configured to pivot-about a pivot 66. One end 68 of rocker arm 64 is connected to bridge 54. The opposite end of rocker arm 64 is connected to a cam assembly 52. In the exemplary embodiment of FIG. 2, cam assembly 52 includes a cam 60 having a cam lobe and mounted on a cam shaft, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. Cam 60 is connected to crankshaft 27 so that a rotation of crankshaft 27 induces a corresponding rotation of cam 60. Cam 60 may be connected to crankshaft 27 through any means readily apparent to one skilled in the art, such as, for example, through a gear reduction assembly (not shown). As one skilled in the art will recognize, a rotation of cam 60 will cause cam follower 62 and associated push rod 61 to periodically reciprocate between an upper and a lower position.

The reciprocating movement of push rod 61 causes rocker arm 64 to pivot about pivot 66. When push rod 61 moves in the direction indicated by arrow 58, rocker arm 64 will pivot and move bridge 54 in the opposite direction. The movement of bridge 54 causes each intake valve 32 to lift and open intake ports 36. As cam 60 continues to rotate, springs 56 will act on bridge 54 to return each intake valve 32 to the closed position.

In this manner, the shape and orientation of cam 60 controls the timing of the actuation of intake valves 32. As one skilled in the art will recognize, cam 60 may be configured to coordinate the actuation of intake valves 32 with the movement of piston 24. For example, intake valves 32 may be actuated to open intake ports 36 when piston 24 is moving toward a bottom dead center position within cylinder 22 to allow air to flow from intake passageway 41 into cylinder 22.

A similar valve actuation assembly 44 may be connected to each pair of exhaust valves 34 for each cylinder 22. A second cam (not shown) may be connected to crankshaft 27 to control the actuation timing of exhaust valves 34. Exhaust valves 34 may be actuated to open exhaust ports 38 when piston 24 is moving toward a top dead center position within cylinder 22 to allow exhaust to flow from cylinder 22 into exhaust passageway 43.

As shown in FIG. 2, valve actuation assembly 44 also includes a valve actuator 70. In the illustrated exemplary embodiment, valve actuator 70 is fluid actuated. It should be understood, however, that valve actuator 70 may be actuated electrically or hydraulically.

In the illustrated exemplary embodiment, valve actuator 70 includes an actuator cylinder 72 that defines an actuator chamber 76. An actuator piston 74 is slidably disposed within actuator cylinder 72 and is connected to an actuator rod 78. A return spring (not shown) may act on actuator piston 74 to return actuator piston 74 to a home position. Actuator rod 78 is engageable with an end 68 of rocker arm 64.

A fluid line 80 is connected to actuator chamber 76. Pressurized fluid may be directed through fluid line 80 into actuator chamber 76 to move actuator piston 74 within actuator cylinder 72. Movement of actuator piston 74 causes actuator rod 78 to engage end 68 of rocker arm 64.

Fluid may be introduced to actuator chamber 76 when intake valves 32 are in the open position to move actuator rod 78 into engagement with rocker arm 64 to thereby hold intake valves 32 in the open position. Alternatively, fluid may be introduced to actuator chamber 76 when intake valves 32 are in the closed position to move actuator rod 78 into engagement with rocker arm 64 and pivot rocker arm 64 about pivot 66 to thereby open intake valves 32.

Figure 3:
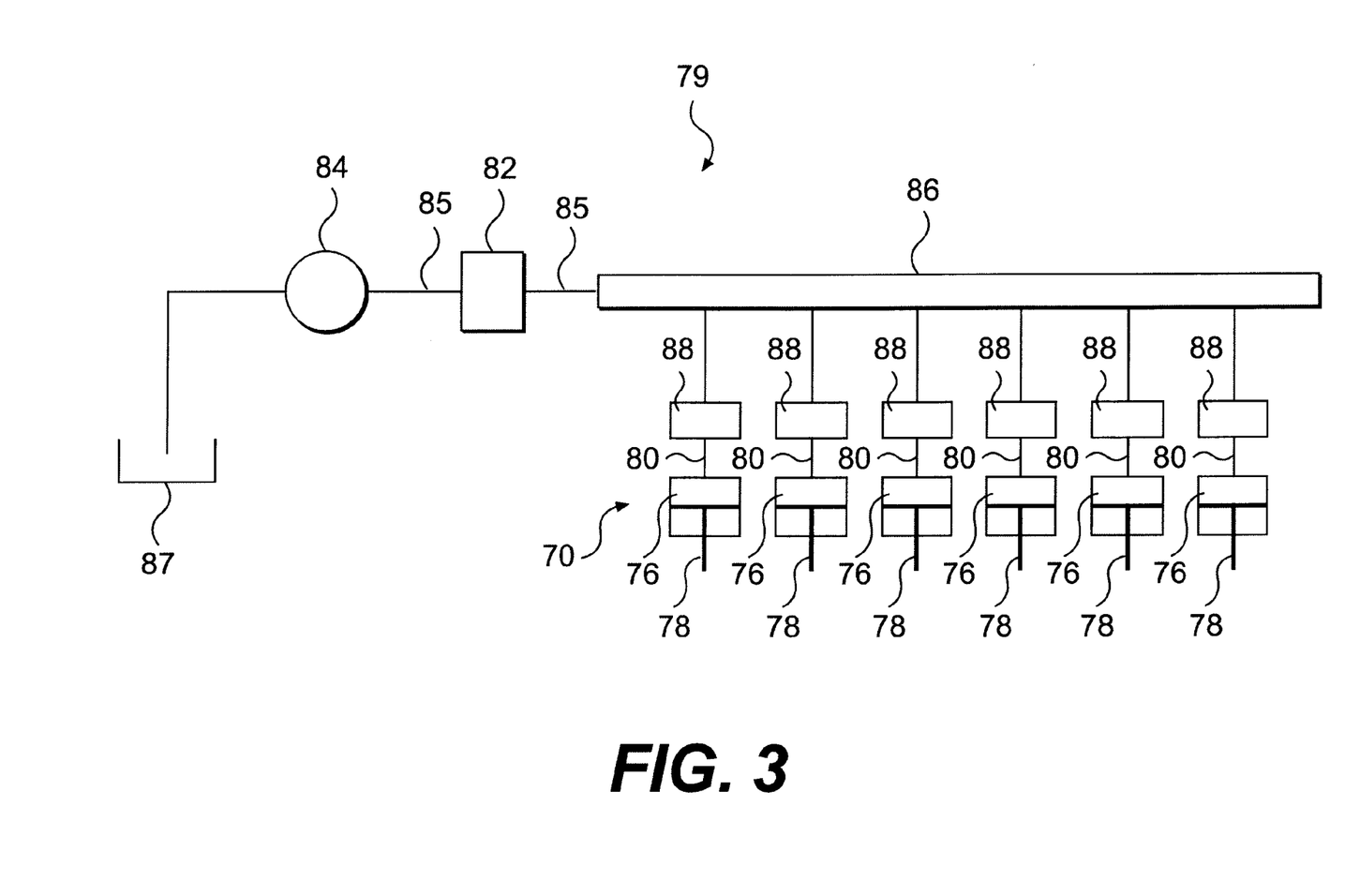
FIG. 3 is a schematic and diagrammatic representation of a fluid supply system for a valve actuator for an engine valve in accordance with an exemplary embodiment of the present invention.

As illustrated in FIGS. 1 and 3, a source of fluid 84 is provided to draw fluid from a tank 87 and to supply pressurized fluid to valve actuator 70. Source of fluid 84 may be part of a lubrication system, such as typically accompanies an internal combustion engine. Such a lubrication system may provide pressurized fluid having a pressure of, for example, less than 700 KPa (100 psi) or, more particularly, between about 410 KPa and 620 KPa (60 psi and 90 psi). Alternatively, the source of fluid may be a pump configured to provide fluid at a higher pressure, such as, for example, between about 10 MPa and 35 MPa (1450 psi and 5000 psi).

A fluid supply system 79 connects source of fluid 84 with valve actuator 70. In the exemplary embodiment of FIG. 3, source of fluid 84 is connected to a fluid rail 86 through fluid line 85. A control valve 82 is disposed in fluid line 85. Control valve 82 may be opened to allow pressurized fluid to flow from source of fluid 84 to fluid rail 86. Control valve 82 may be closed to prevent pressurized fluid from flowing from source of fluid 84 to fluid rail 86.

As illustrated in FIG. 3, fluid rail 86 supplies pressurized fluid from source of fluid 84 to a series of valve actuators 70. Each valve actuator 70 may be associated with either the intake valves 32 or the exhaust valves 34 of a particular engine cylinder 22 (referring to FIG. 1). Fluid lines 80 direct pressurized fluid from fluid rail 86 into the actuator chamber 76 of each valve actuator 70.

A directional control valve 88 may be disposed in each fluid line 80. Each directional control valve 88 may be opened to allow pressurized fluid to flow between fluid rail 86 and actuator chamber 76. Each directional control valve 88 may be closed to prevent pressurized fluid from flowing between fluid rail 86 and actuator chamber 76. Directional control valve 88 may be normally biased into a closed position and actuated to allow fluid to flow through directional control valve 88. Alternatively, directional control valve 88 may be normally biased into an open position and actuated to prevent fluid from flowing through directional control valve 88. One skilled in the art will recognize that directional control valve 88 may be any type of controllable valve, such as, for example a two coil latching valve.

One skilled in the art will recognize that fluid supply system 79 may have a variety of different configurations and include a variety of different components. For example, fluid supply system 79 may include a check valve placed in parallel with directional control valve 88 between control valve 82 and hydraulic actuator 70. In addition, fluid supply system 79 may include a source of high pressure fluid. Fluid supply system 79 may also include a snubbing valve to control the rate of fluid flow from hydraulic actuator 70 and a damping system, which may include an accumulator and a restricted orifice, to prevent pressure oscillations in actuator chamber 76 and fluid line 80.

As shown in FIG. 1, a controller 100 is connected to each valve actuation assembly 44 and to control valve 82. Controller 100 may include an electronic control module that has a microprocessor and a memory. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

Controller 100 may be programmed to control one or more aspects of the operation of engine 20. For example, controller 100 may be programmed to control valve actuation assembly 44, the fuel injection system, and any other engine function commonly controlled by an electronic control module. Controller 100 may control engine 20 based on the operating conditions of the engine and/or instructions received from an operator.

Controller 100 may control valve actuation assembly 44 by transmitting a signal, such as, for example, a current, to directional control valve 88. The transmitted signal may result in the selective opening and/or closing of directional control valve 88. If directional control valve 88 is a normally closed valve, the transmitted signal may cause directional control valve 88 to open for a certain period of time. If directional control valve 88 is a normally open valve, the transmitted signal may cause directional control valve to close for a certain period of time. By controlling the opening and closing of directional control valve 88, controller 100 may control the flow of fluid to and from valve actuator 70 and thereby control the engagement of actuator rod 78 with rocker arm 64. One skilled in the art will recognize that type and form of the signal transmitted to directional control valve 88 will depend upon the operating characteristics of the particular directional control valve 88.

Figure 4A:
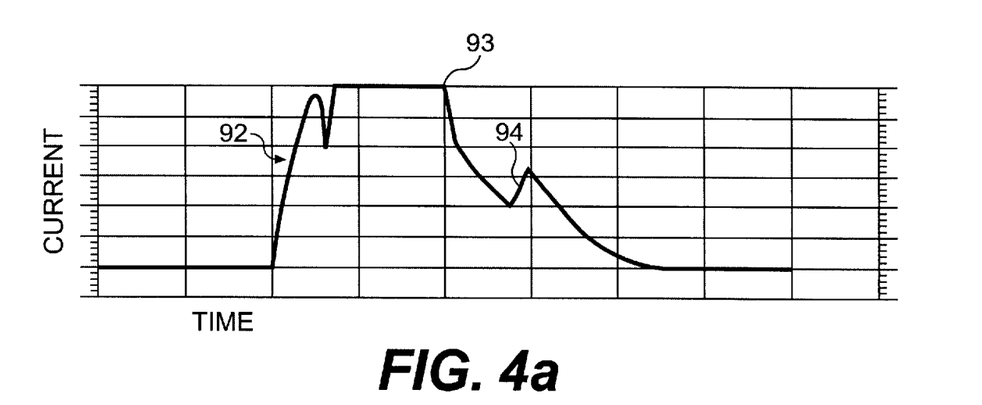
FIG. 4a is a graphic illustration of an exemplary signal configured to actuate a valve actuator in accordance with an exemplary embodiment of the present invention.
Figure 4B:
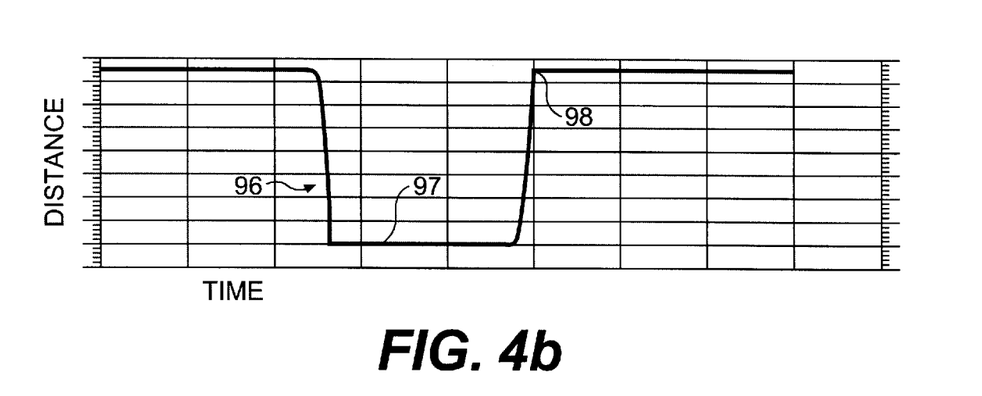
Figure 4C:
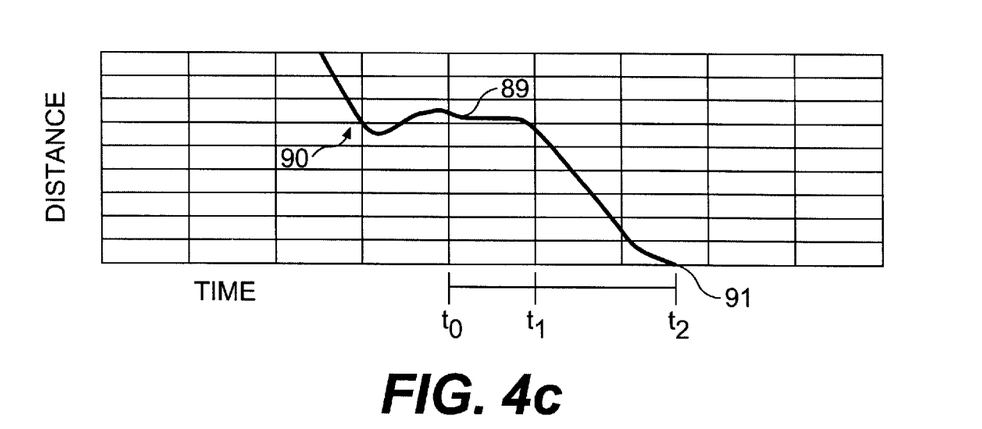

The graph of FIG. 4a illustrates an exemplary signal 92 for a normally open directional control valve 88. In the illustrated embodiment, signal 92 is a current having a waveform that is configured to close directional control valve 88 for a predetermined period of time. One skilled in the art will recognize that signal 92 may have any shape or waveform required to control directional control valve 88 to thereby release valve actuator 70. The graph of FIG. 4b illustrates the displacement of directional control valve 88 that corresponds to signal 92. The graph of FIG. 4c illustrates the corresponding displacement 90 of engine valve 32.

As illustrated in FIG. 2, valve actuation assembly 44 may include a sensor 77. Sensor 77 is configured to sense the position of engine valves 32. As illustrated, sensor 77 may determine the position of engine valves 32 indirectly by sensing the position of a component of valve actuator 70, such as, for example actuator piston 74 or actuator rod 78. Sensor 77 may also be configured to sense the position of engine valve 32 directly, such as, for example, by sensing the displacement of valve stem 46 or bridge 54.

Sensor 77 may be magnetic sensor, such as for example, a "LVDT" type sensor, or any other device that is readily apparent to one skilled in the art as capable of sensing the position and/or movement of valve actuator 70 or engine valves 32. In addition, sensor 77 may be permanently attached to valve actuation assembly 44 or sensor 77 may be temporarily engageable with valve actuation assembly 44.

Sensor 77 may also be operatively connected with fluid line 80. Sensor 77 may be configured to sense the pressure of the fluid within fluid line 80. Alternatively, sensor 77 may be configured to sense the flow rate of fluid through fluid line 80.

As illustrated in FIG. 1, controller 100 may include a current sensor 101. Current sensor is configured to monitor the current applied to directional control valve 88. Current sensor 101 may be any type of sensor readily apparent to one skilled in the art as capable of sensing the magnitude of a current. It should be understood that current sensor 101 may be part of controller 100 or current sensor 101 may be a separate sensor positioned at any appropriate location.

Figure 5:
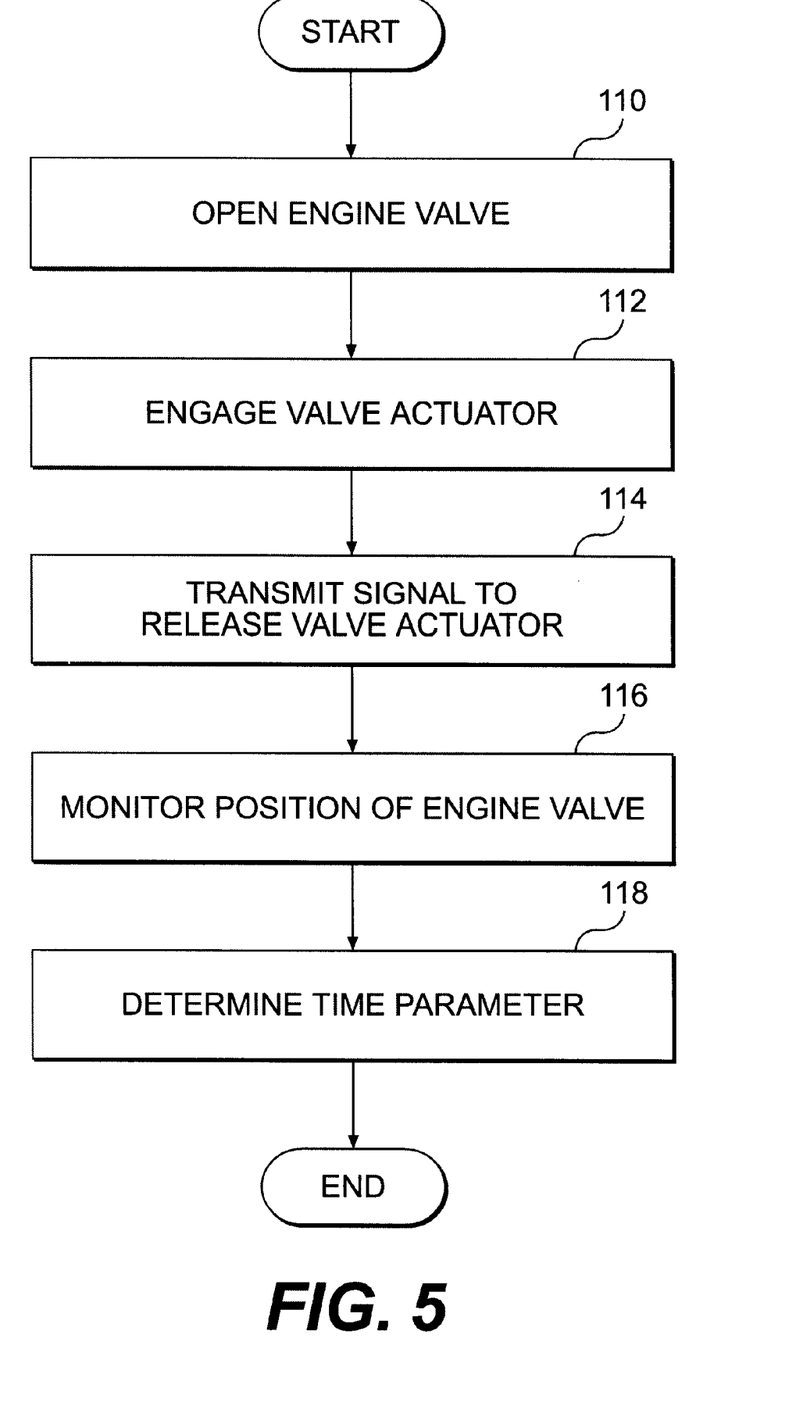
FIG. 5 is a flowchart illustrating an exemplary method of calibrating a valve actuation assembly in accordance with an exemplary embodiment of the present invention.

Controller 100 may use the information provided by sensors 77 and 101 to calibrate valve actuation assembly 44. The flowchart of FIG. 5 illustrates an exemplary method of calibrating valve actuation assembly 44.

Industrial Applicability

With reference to the drawings, and in operation, controller 100 may selectively operate valve actuator 70 to prevent an engine valve, such as intake valve 32, from closing. As mentioned above, the rotation of cam 60 operates push rod 61 and rocker arm 64 to open and close intake valves 32. Typically, the opening of intake valves 32 substantially coincides with the start of an intake stroke of piston 24.

As cam 60 and push rod 61 start to pivot rocker arm 64, controller 100 ensures control valve 82 and directional control valve 88 are in an open position. This allows pressurized fluid to flow from source of fluid 84 through fluid rail 86 and into actuator chamber 76. The force of the fluid entering actuator chamber 76 moves actuator piston 74 so that actuator rod 78 extends to follow end 68 of rocker arm 64 as rocker arm 64 pivots to open intake valves 32.

The distance and rate of movement of actuator rod 78 will depend upon the configuration of actuator chamber 76 and fluid supply system 79. Actuator chamber 76 may be configured to allow actuator rod 78 to follow rocker arm 64 for a predetermined distance. The predetermined distance may be a portion of the distance that rocker arm 64 moves when opening intake valves 32. Fluid supply system 79 may be configured to provide a sufficient flow of fluid to so actuator chamber 76 to ensure that actuator chamber 76 is filled with fluid and that actuator rod 78 is fully extended before cam 60 returns intake valve 32 to the closed position.

Controller 100 may actuate valve actuator 70 by closing directional control valve 88. This prevents fluid from escaping from actuator chamber 76. As cam 60 continues to rotate and springs 56 urge intake valves 32 towards the closed position, actuator rod 78 will engage end 68 of rocker arm and prevent intake valves 32 from closing. As long as directional control valve 88 remains in the closed position, the trapped fluid in actuator chamber 76 prevents springs 56 from returning intake valves 32 to the closed position. Thus, valve actuator 70 will hold intake valves 32 in the open position, independently of the action of cam assembly 52.

Controller 100 may disengage valve actuator 70 to allow intake valves 32 to close by opening directional control valve 88. This allows the pressurized fluid to flow out of actuator chamber 76. The force of spring 56 forces the fluid from actuator chamber 76, thereby allowing actuator piston 74 to move within actuator cylinder 72. This allows rocker arm 64 to pivot so that intake valves 32 are moved to the closed position.

A period of time will elapse between the time controller 100 instructs directional control valve 88 to open and the closing of intake valve 32. This time period may be affected by several factors, including, for example, the characteristics of directional control valve 88, the properties of the fluid, the characteristics of valve actuation assembly 44, and the characteristics of fluid supply system 79.

Controller 100 may time the closing of intake valves, or exhaust valves, to implement any variation on a conventional diesel or Otto cycle readily apparent to one skilled in the art. For example, controller 100 may delay the closing of intake valve 32 for a portion of the compression stroke of a piston to implement a "late intake" Miller cycle. Controller 100 may implement other variations in a conventional diesel or Otto cycle in a similar manner.

The selective implementation of the late intake type Miller cycle, or other such valve actuation variation, may improve the fuel efficiency of engine 20. However, to obtain the fuel efficiency benefits, controller 100 should closely coordinate the closing of engine valve 32 with a particular location and/or motion of piston 24. Ideally, controller 100 should coordinate the closing of engine valve 32 to within +/−1° of crankshaft 27 rotation of the expected closing crankshaft 27 angle.

To obtain this precise coordination, each valve actuation assembly 44 may be calibrated to determine a timing parameter that is indicative of the amount of time that elapses between the opening of directional control valve 88 and the closing of engine valve 32. Controller 100 may use the timing parameter to determine when to open directional control valve 88 to achieve the proper closing of intake valve 32. An exemplary method of determining such a timing parameter is illustrated in FIG. 5.

As shown in FIG. 5, intake valve 32 is moved to an open position, such as, for example, by cam assembly 52. (Step 110). Directional control valve 88 is moved to a closed position. Referring to the exemplary signal 92 of FIG. 4a, an increasing current may be transmitted to directional control valve 88 to close the valve. As shown in FIG. 4b, the increasing current causes a displacement 96 in directional control valve 88 as the valve moves to a closed position 97.

When directional control valve 88 moves to closed position 97, fluid is prevented from escaping from actuator chamber 76. As intake valve 32 is closed by cam assembly 52, actuator rod 78 engages rocker arm 64. (Step 112). The force of the fluid in actuator chamber 76 holds intake valve 32 in a partially opened position 89.

A signal to release valve actuator 70 is transmitted. (Step 114). The transmitted signal may be, for example, a change in the current applied to directional control valve 88. Referring to the exemplary signal 92 of FIG. 4a, the transmitted signal is a reduction in current magnitude from a peak current 93. As shown in FIG. 4b, the reduction in the magnitude of the current applied to directional control valve 88 allows directional control valve 88 to return to an open position 98. It should be noted that, in the case of a normally closed valve, the transmitted signal may be an increase in an applied current.

The position of intake valve 32 is monitored. (Step 116) As directional control valve 88 opens, the force of spring 56 on intake valve 32 forces fluid out of actuator chamber 76. This, in turn, allows intake valve 32 to move towards a closed position 91. Sensor 77 (referring to FIG. 2) monitors the position of intake valve 32 to determine when intake valve 32 has returned to closed position 91. Sensor 77 may monitor the position of intake valve 32 directly or sensor 77 may monitor the position of intake valve 32 indirectly by monitoring the position of valve actuator 70. Either of these measuring techniques will allow sensor 77 to determine the amount of valve lift of intake valve 32.

Sensor 77 may also monitor the pressure and/or flow of fluid from actuator chamber 76 through fluid line 80 to determine when intake valve 32 has returned to the closed position. For example, the reduction of the flow of fluid from actuator chamber 76 to approximately zero may indicate that actuator piston 74 has stopped moving and, thus, that intake valve 32 is closed. In addition, the reduction in the pressure of the fluid in actuator chamber 76 and fluid line 80 to a particular level may indicate that intake valve 32 has returned to the closed position.

A time parameter is determined. (Step 118). The time parameter is indicative of the elapsed time between the transmission of the signal to open directional control valve 88 and the closing of intake valve 32 (as indicated by time, $t_2$ in FIG. 4c). The time parameter may be measured between any measurable points encountered in the process of disengaging hydraulic actuator 70 to close intake valve 32. For example, the starting point may be the time at which the current is changed to decrease the magnitude of the current from peak level 93, as indicated by $t_0$ in FIG. 4c. Alternatively the starting point may be the time at which directional control valve 88 moves to the open position, as indicated by $t_1$ in FIG. 4c. The opening of directional control valve 88 may be indicated by a current inflection 94 in the current applied to directional control valve 88. Other possible measurable points may be readily apparent to one skilled in the art.

Additional parameters related to the movement of intake valve 32 may also be monitored. For example, the lift height of the intake valve may be measured as a function of time. Controller 100 may use this information if a particular lift height of an engine valve is desired. One skilled in the art may recognize that additional parameters, such as, for example, valve velocity and acceleration, may also be measured and stored during a calibration process.

Based on the determined time parameter, controller 100 may calculate the appropriate time to transmit a signal to disengage valve actuator 70 to achieve a desired closing of an engine valve. For example, by monitoring the rotational speed and/or angle of crankshaft 27 or cam 60 and knowing the time parameter, controller 100 may transmit the signal to open directional control valve 88 at the appropriate position of crankshaft 27 or cam 60 to achieve the desired closing timing of the engine valve.

The previously described method for determining the time parameter for a valve actuation assembly 44 may be performed on a valve-by-valve basis or on a engine-by-engine basis. For example, a calibration procedure may be performed on each valve actuation assembly 44 to determine the time parameter for a particular valve actuation assembly 44 before the valve actuation assembly 44 is installed in an engine 20. The time parameter may be transferred to the controller 100 or engine control module through any known procedure. For example, the time parameter may be encoded in a bar code that is affixed to the particular valve actuation assembly 44. The bar code may then be scanned during engine assembly to enter the time parameter into the engine control module. Alternatively, the time parameter may be tied to a serial number for the particular valve actuation assembly 44 and stored in a database. The time parameter may then be input to the engine control module during the assembly process of the engine 20.

The described calibration procedure may also be performed after the engine 20 is assembled. A sensor 77 may be temporarily attached to each valve actuation assembly 44 in the engine 20 to determine the respective time parameter. After the calibration procedure is performed and the engine control module is updated with the time parameter, the sensors 77 may be removed from the valve actuation assemblies 44.

In yet another alternative, the calibration procedure may be performed during the course of ordinary engine operation. A sensor 77 may be permanently attached to each valve actuation assembly 44 to provide a continual monitoring of the position of the respective engine valve 32. The engine controller may continually monitor the position of the respective engine valve 32 and update the time parameter continually during the operation of the engine 20. In this manner, the current operating conditions of the engine 20 may be taken into consideration in the calibration process.

As will be apparent from the foregoing description, the present disclosure describes a method and system for controlling a variable valve actuation assembly. A time parameter that is indicative of the time required to close a particular engine valve is determined. The time parameter may be used during the operation of an engine to coordinate the closing of the engine valve with a particular location and/or motion of a piston.

The determination and use of the time parameter for each valve actuation assembly may compensate for performance variations in each valve actuation assembly due to manufacturing variances. Accordingly, the manufacturing tolerances for each valve actuation assembly may be reduced, thereby decreasing manufacturing and testing costs. Elimination of performance variations between valve actuation assemblies may further reduce variations in performance between different engines.

In addition, the use of the time parameter may improve the performance characteristics of the engine. The time parameter will allow for precise control over the valve actuation timing. This precise control may translate to an improvement in the fuel efficiency of the engine. In addition, the time parameter may improve the operating characteristics of the engine, such as, for example, by reducing engine vibration. The use of the time parameter may also reduce the amount of emissions generated during the operation of the engine.

It will be apparent to those skilled in the art that various modifications and variations can be made in the system and method of the present disclosure without departing from the scope or spirit of the invention. Other embodiments will be apparent to those skilled in the art from consideration of the specification and practice of the system and method disclosed herein. It is intended that the specification and examples be considered as exemplary only, with a true scope of the disclosure being indicated by the following claims and their equivalents.

What is claimed is:

1. A method of calibrating a variable valve actuation system, comprising:
   moving an engine valve from a first position where the engine valve blocks a flow of fluid to a second position where the engine valve passes a flow of fluid;
   trapping fluid in a valve actuator to prevent the engine valve from returning to the first position;
   transmitting a signal to release the trapped fluid from the valve actuator to allow the engine valve to return to the first position;
   monitoring a position of the valve actuator to determine when the engine valve has returned to the first position; and
   determining a time parameter indicative of an elapsed time between the transmission of the signal and movement of the engine valve to the first position.

2. The method of claim 1, further including permanently attaching a sensor to the valve actuator.

3. A method of calibrating a variable valve actuation system, comprising:
   moving an engine valve from a first position where the engine valve blocks a flow of fluid to a second position where the engine valve passes a flow of fluid;
   trapping fluid in a valve actuator to prevent the engine valve from returning to the first position;
   transmitting a signal to cause release the trapped fluid from the valve actuator to allow the engine valve to return to the first position, wherein the transmitted signal is a reduction in a magnitude of a current waveform;
   monitoring the current transmitted to a directional control valve;
   determining when the engine valve returns to the first position; and
   determining a time parameter indicative of an elapsed time between the transmission of the signal and movement of the engine valve to the first position.

4. The method of claim 3, further including monitoring a position of the engine valve to determine when the engine valve has returned to the first position.

5. A method of calibrating a variable valve actuation system, comprising:
   moving an engine valve from a first position where the engine valve blocks a flow of fluid to a second position where the engine valve passes a flow of fluid;
   trapping fluid in a valve actuator to prevent the engine valve from returning to the first position;
   transmitting a signal to release the trapped fluid from the valve actuator to allow the engine valve to return to the first position;
   determining when the engine valve returns to the first position;
   determining a time parameter indicative of an elapsed time between the transmission of the signal and movement of the engine valve to the first position; and
   adjusting a second signal transmitted to the valve actuator based on the time parameter.

6. An engine valve actuation system, comprising:
   an engine valve moveable between a first position where the engine valve blocks a flow of fluid and a second position where the engine valve passes a flow of fluid;
   a spring engaged with the engine valve and biasing the engine valve towards the first position;
   a valve actuator having a piston adapted to operatively engage the engine valve and an actuator chamber, the valve actuator adapted to trap fluid in the actuator chamber to thereby prevent the engine valve from returning to the first position;
   a sensor configured to measure the displacement of the valve actuator and to provide an indication when the engine valve is at the first position; and
   a controller configured to deliver a control signal to the valve actuator to release fluid trapped in the actuator chamber to thereby return the engine valve to the first position and to receive said indication from the sensor, the controller determining an elapsed time between the delivery of the control signal and movement of the engine valve to the first position.

7. The system of claim 6, wherein the the sensor monitors the position of the piston.

8. The system of claim 6, wherein the sensor is permanently engaged with the valve actuator.

9. An engine valve actuation system, comprising:

an engine valve moveable between a first position where the engine valve blocks a flow of fluid and a second position where the engine valve passes a flow of fluid;

a spring engaged with the engine valve and biasing the engine valve towards the first position;

a valve actuator having a piston adapted to operatively engage the engine valve and an actuator chamber, the valve actuator adapted to trap fluid in the actuator chamber to thereby prevent the engine valve from returning to the first position, a sensor configured to provide an indication when the engine valve is at the first position, wherein the sensor measures at least one of a fluid pressure in the actuator chamber and a fluid flow rate from the actuator chamber; and a controller configured to deliver a control signal to the valve actuator to release fluid trapped in the actuator chamber to thereby return the engine valve to the first position and to receive said indication from the sensor, the controller determining an elapsed time between the delivery of the control signal and movement of the engine valve to the first position.

10. The system of claim 9, further including a directional control valve configured to control a flow of fluid to and from the actuator chamber.

11. The system of claim 10, wherein the controller delivers a current waveform to the directional control valve to operate the valve actuator.

12. An engine, comprising:

an engine block defining a cylinder;

a piston slidably disposed within the cylinder;

an engine valve associated with the cylinder and moveable between a first position where the engine valve blocks a flow of fluid and a second position where the engine valve passes a flow of fluid;

a cam assembly configured to move the at least one engine valve between the first and second positions;

a spring engaged with the engine valve and biasing the engine valve towards the first position;

a valve actuator having a piston adapted to operatively engage the engine valve and an actuator chamber, the valve actuator adapted to trap fluid in the actuator chamber to thereby prevent the engine valve from returning to the first position, a sensor configured to deliver a positional signal in response to the engine valve being at the first position; and a controller connected to the sensor and configured to deliver a signal to cause the valve actuator to release fluid trapped in the actuator chamber to thereby return the engine valve to the first position, the controller determining a time parameter indicative of an elapsed time between the delivery of the signal and the return of the engine valve to the first position.

13. The engine of claim 12, wherein the sensor measures one of the displacement of the valve actuator and the displacement of the at least one engine valve.

14. The engine of claim 13, wherein the sensor monitors the position of the piston.

15. The engine of claim 14, wherein the sensor measures at least one of a fluid pressure in the actuator chamber and a fluid flow rate from the actuator chamber.

16. The engine of claim 15, further including a directional control valve configured to control a flow of fluid to and from the actuator chamber.

* * * * *